United States Patent [19]

Peters

[11] 4,270,850

[45] Jun. 2, 1981

[54] MICROIMAGE STORAGE AND RETRIEVAL APPARATUS

[75] Inventor: Arnis E. Peters, LaCrosse, Wis.

[73] Assignee: Realist, Inc., Menomonee Falls, Wis.

[21] Appl. No.: 63,247

[22] Filed: Aug. 3, 1979

Related U.S. Application Data

[63] Continuation of Ser. No. 861,523, Dec. 19, 1977, Pat. No. 4,203,658.

[51] Int. Cl.³ .................... G03B 23/08; G03B 21/11
[52] U.S. Cl. .............................. 353/27 R; 353/26 R; 353/95; 353/78
[58] Field of Search .................... 353/23, 26 R, 27 R, 353/95, 74, 77, 78; 350/255

[56] References Cited

U.S. PATENT DOCUMENTS

| Re. 22,517 | 7/1944 | Hopkins | 353/79 |
|---|---|---|---|
| 2,110,484 | 3/1938 | Hopkins | 353/79 |
| 2,610,540 | 9/1952 | Beitz | 353/23 |
| 3,284,923 | 11/1966 | Leslie | 353/26 R |
| 3,739,069 | 6/1973 | Sandmeier | 353/26 R |
| 3,784,295 | 1/1974 | Okano | 353/95 |
| 3,917,389 | 11/1975 | Shoji | 353/27 R |
| 4,087,166 | 5/1978 | Rothbart | 353/26 A |

Primary Examiner—Steven L. Stephan
Attorney, Agent, or Firm—Norman Lettvin

[57] ABSTRACT

There is disclosed herein apparatus for positioning rows and columns of microimage frames imprinted on a cassetted filmstrip for projection and display. The filmstrip is longitudinally movable in incremental amounts through an elongated cassette passageway, the passageway having a transverse aperture for permitting projected light to pass through a selected portion of the filmstrip for enlarged and focused microimage display. The positioning apparatus includes a first transparent plate located in the path of projected light but spaced to one side of and away from the plane defined by the filmstrip as it traverses the passageway, a second transparent plate located in the path of projected light but spaced on the opposite side of and away from the filmstrip traversing plane, and an assembly operable prior to filmstrip movement through the cassette passageway for effecting separation of the first and second plates, the assembly also operable after a selected portion of the filmstrip has been moved into and stopped in the path of projected light for clamping the selected filmstrip portion between the first and second plates in a film-strip focusing plane.

4 Claims, 9 Drawing Figures

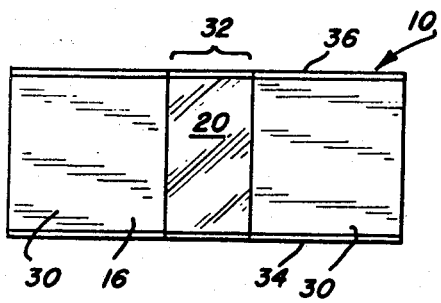
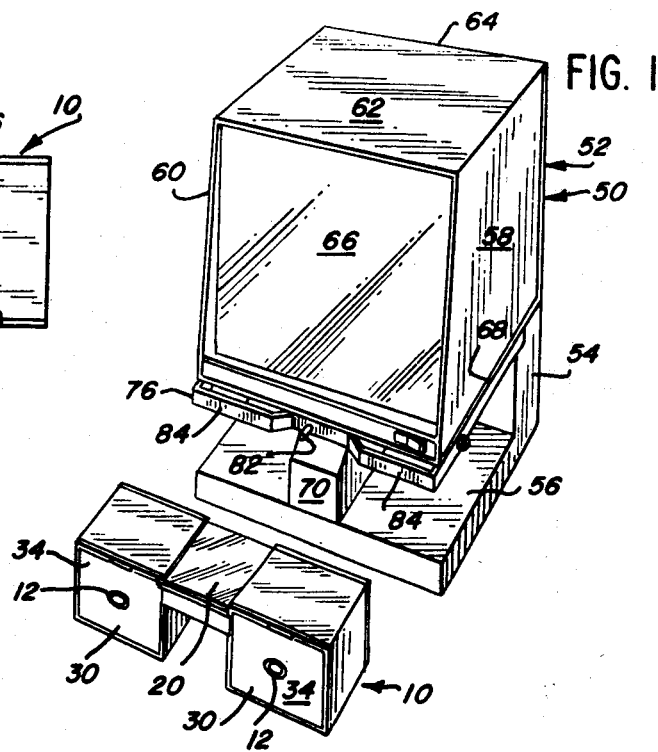
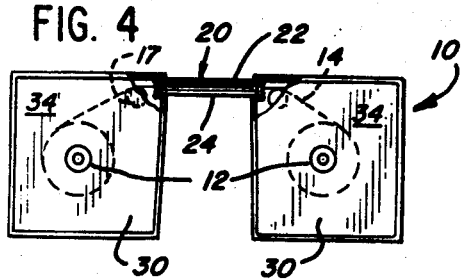
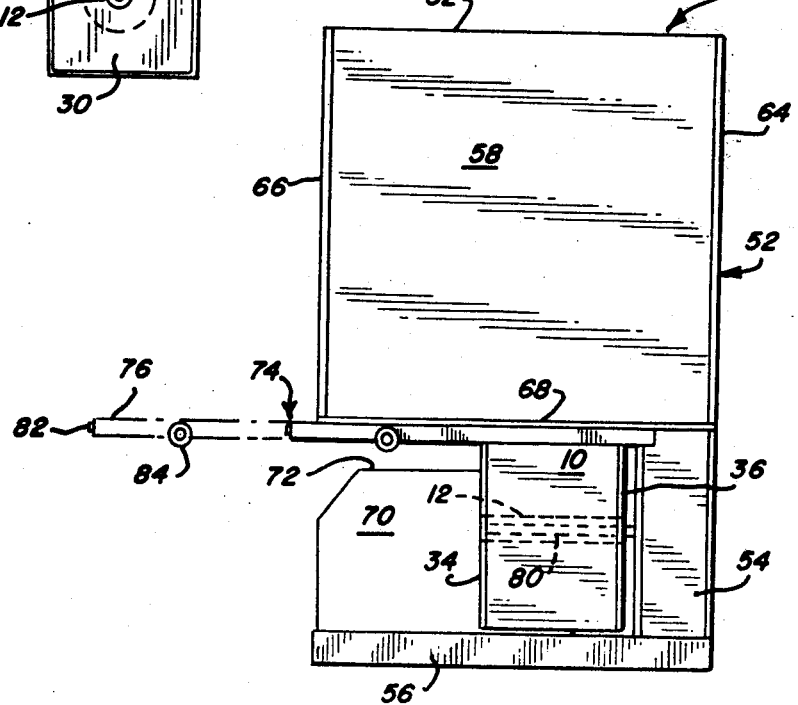

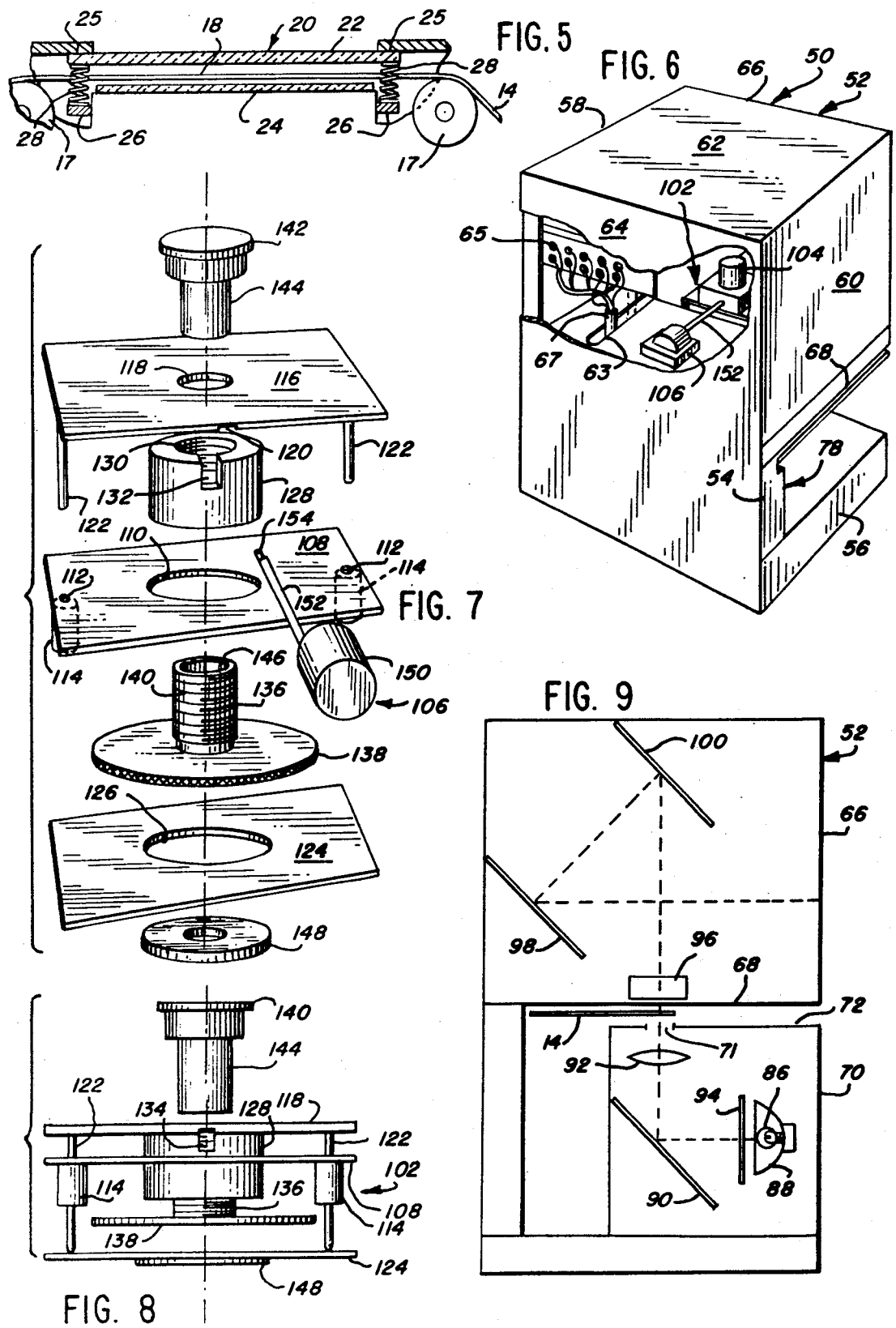

MICROIMAGE STORAGE AND RETRIEVAL APPARATUS

This is a continuation, of application Ser. No. 861,523, filed Dec. 19, 1977 now U.S. Pat. No. 4,203,658.

FIELD OF THE INVENTION

This invention relates to microfilm cassettes and viewers for illuminating, enlarging, projecting and displaying selected frames of the microfilm on a viewing screen and more particularly for a novel cassette and viewer specially adapted to position microimage frames for projection in a preselected focal plane.

BACKGROUND OF THE INVENTION

The printing of microimages on microfiche cards and the use of viewers for illuminating, enlarging, projecting an displaying selected frames of the cards on a viewing screen is well known in the art. The printing of microimages on filmstrips and the use of viewers for illuminating, enlarging, projecting and displaying selected frames of the filmstrip on a viewing screen is also well known in the art.

It is further known to house the filmstrip on a cassette for presenting a length of flexible film for projection and display. By storing information on a microfilmstrip, an entire book or a lengthy catalog of parts may be stored on a single compact cassette. The prior art, as evidenced by U.S. Pat. No. 3,700,321, has fixedly located a generally U-shaped cassette with a microimage holding bight portion window between an illuminating system and a lens assembly to precisely align a selected microimage with the optical system of the viewer.

There exist countless situations in which it would be advantageous to store a greater number of microimage frames on a single filmstrip. For example, it is desirable to store a full set of volumns of a given reference or the entire inventory of a given company within a single cassette. To this end, previous patents such as U.S. Pat. No. 3,319,517 have provided a cassetted filmstrip, the transverse dimension thereof being great enough to include a plurality of rows of microimages so as to substantially increase the amount of printed matter that can be stored in a single cassette.

As the width of the cassetted filmstrip was increased, it became necessary to modify existing viewer-cassette assemblies to accept, project and display selected microimage frames regardless of their longitudinal or transverse location on the filmstrip. Early microfiche viewers provided for manual movement of a fiche supporting table in both transverse and longitudinal directions to align a selected microimage between a lower source of illumination and an upper projection lens system. As technology advanced and 8 and 16 mm cassetted microfilm supplanted microfiche, there was no need to traverse the width of the film. Because the transverse dimension of the filmstrip was relatively small, its full width could be projected onto the viewing screen.

With the continuing development of microfilm technology came the advent of wider microfilmstrips. As the full filmstrip width could no longer be displayed on the viewing screen at one time, it became necessary to incorporate a transverse filmstrip scanner into the viewer assembly. One type of scanner was developed in U.S. Pat. No. 3,319,517. The scanner basically included a transport assembly on which the film spools were secured for slidable movement relative to a lens projection assembly. However, the filmstrips of that and other prior art devices were not housed in a cassette and therefore were easily scratched and otherwise injured by the constant human handling necessary to prepare the filmstrip for projection.

It is accordingly a major purpose of the present invention to provide a cassette for housing and transporting filmstrips having transverse dimensions great enough to house a large number of microimage frames thereacross and to provide a viewer having a movable carriage in which the cassette is placed for scanning and projecting those transverse microimage frames.

Of course, the filmstrip length is many times greater than its width. With this in mind, prior viewer systems incorporated drive assemblies for the selective longitudinal transportation of the filmstrip within the cassette. However, none of the previous systems employed a movable carriage for transversely scanning the width of a cassetted filmstrip.

It is yet another object of the present invention to provide a viewer having a movable carriage for holding a cassette and in which the drive means for transporting the filmstrip and presenting selected longitudinal microimage frames for projection are mounted on the carriage for movement therewith.

Many previous viewers for projecting and displaying filmstrips such as the viewer shown in U.S. Pat. No. 3,319,517 have tensioned the filmstrip over a plastic plate so as to hold the filmstrip in the focal plane of the objective projecting lens. But the constant contact between the filmstrip and the plate often caused scratching or other injury of the filmstrip which seriously interfered with the projected image because of the optical magnification occasioned by the viewer. Other viewers held the filmstrip in the focal plane by supporting the longitudinal edges thereof in the area about the optical path of projected light. Of course, as the width of the film increased, such support means failed to adequately maintain the entire filmstrip width under sufficient tension, thereby having sections thereof buckle out of the focal plane.

One additional object of the present invention is to provide a pair of transparent glass plates between which a filmstrip, regardless of width, may be disposed in non-contacting positions for longitudinal movement without contacting either plate and which plates cooperate with a lens assembly housed in the viewer to clamp the entire width of the filmstrip between the plates into a focusing plane only when the filmstrip is not being moved.

These as well as further objects and advantages will become apparent from the detailed explanation of the invention that is provided in the description and claims, and is illustrated in the accompanying drawings.

BRIEF DESCRIPTION OF THE INVENTION

A cassette houses spaced spools upon which portions of an elongated microimage bearing filmstrip are wound. The filmstrip is longitudinally movable within the cassette in incremental amounts for traversing an elongated filmstrip passageway. An aperture is formed through the passageway for permitting projected light to pass through a selected portion of the filmstrip for enlarging and displaying one of the longitudinally and transversely-extending microimage frames. Apparatus is provided for positioning the selected microimage frame in a filmstrip focusing plane. The apparatus includes a first transparent plate located in the path of projected light but spaced to one side of and away from the plane formed by the filmstrip traversing the passageway, a second transparent plate located in the path of projected light but spaced on the opposite side of and away from the filmstrip traversing plane and an assembly operable to separate the first and second plates prior to filmstrip movement through the passageway and also operable for clamping the selected filmstrip portion between the plates in the filmstrip focusing plane after a selected portion of the filmstrip has been moved into and stopped in the path of projected light through the passageway aperture.

A viewer operatively positions the filmstrip separation-clamping assembly in an upper module which is spaced from the base of the viewer. In the space between the module and the base, a filmstrip driving carriage is movably suspended for translation along tracks on the underside of the module. The cassette is mounted on the carriage for manual translational movement relative to the path of projected light to present a selected column of microimage frames into the path of the projected light and the carriage is adapted to move the filmstrip through the cassette passageway to present a selected row of microimage frames into the path of the projected light.

The separation-clamping assembly cooperates with the first and second transparent plates to present selected microimage frames and includes a slidably mounted lens plate which normally rests on and clamps the filmstrip between the glass plates in the focusing plane. When it is desired to transport the filmstrip through the cassette passageway, a viewer drive assembly control is activated to energize a solenoid which separates the glass plates and releases the filmstrip for movement therebetween.

BRIEF DESCRIPTION OF THE DRAWINGS

FIG. 1 is an exploded perspective view of the viewer and cassette of this invention;

FIG. 2 is a side elevational view of the viewer of FIG. 1 showing: (1) the movable carriage in its innermost position in solid lines, and (2) the carriage in its outermost position in phantom lines;

FIG. 3 is a top plan view of the cassette of FIG. 1 showing the transparent aperture in the bight portion thereof;

FIG. 4 is a front elevational view of the cassette of FIG. 1 with a portion of the bight cut-away to show the upper and lower glass plates across the aperture in the bight portion;

FIG. 5 is an enlarged fragmentary front view of the cut-away portion of the bight shown in FIG. 4 and illustrating the relationship of that bight portion to the glass plates;

FIG. 6 is a perspective view of the viewer of this invention with the rear thereof partially broken away to illustrate the positioning of the separation-clamping means and the slot through the bottom panel of the module;

FIG. 7 is an exploded perspective view of the plate separation-clamping means of this invention;

FIG. 8 is a front elevational view of the assembled plate separation-clamping means of this invention; and FIG. 9 is a side elevational view of the viewer schematically showing the optical system of this invention.

DETAILED DESCRIPTION OF THE INVENTION

Referring now to the drawings, the improved microfilm cassette is generally shown as 10, and the improved microfilm viewer is generally indicated as 50.

The cassette 10 houses a pair of conventional, spaced annular spool means 12, upon which an elongated microimage bearing filmstrip 14 (FIG. 4) is wound. The cassette 10 includes an elongated filmstrip passageway 16 formed by the horizontal path of travel of the filmstrip 14 as it traverses the distance between the spaced spool means 12. A pair of idling rollers 17 are rotatably mounted within the cassette 10. The filmstrip 14 is trained over the idling rollers 17 for selected incremental movement through the elongated filmstrip passageway 16. The path of the filmstrip 14 as it traverses the passageway 16 between the pair of idling rollers 17 defines a filmstrip traversing plane 18 (FIG. 6).

The elongated passageway 16 includes a transverse aperture 20 for permitting projected light to pass through a selected portion of the filmstrip 14 for greatly enlarged and focused display of the microimage that is provided on the selected portion of the filmstrip. First and second generally rectangular transparent, glass plates 22 and 24 respectively, are disposed within the transverse aperture 20 parallel to each other and filmstrip 14. The upper plate 22 is located in the path of projected light and spaced to one side of and away from the filmstrip 14 in its filmstrip traversing plane 18 while the lower plate 24 is also located in the path of projected light but spaced on the opposite side of and away from the filmstrip 14 in its filmstrip traversing plane 18.

With specific reference to FIG. 6, filmstrip 14 can be seen to be in its filmstrip traversing plane 18 wherein it is disposed parallel to the upper plate 22 and the lower plate 24. The lower plate 24 is fixedly mounted relative to the aperture 20 in the filmstrip passageway 16. The upper plate 22 is of slightly greater width than both the lower plate 24 and the aperture 20 such that the edges 25 of the aperture 20 retain the upper plate 22 within the aperture 20 and limit the upward movement of the upper plate 22. The lower plate 24, being fixedly mounted, limits the downward movement of the upper plate 22. Stop mountings 26 are provided beneath each corner of the upper plate 22 and serve to support upper plate biasing springs 28. The springs 28 normally bias the upper plate 22 into an uppermost position against the edges 25 of the aperture 20. Downward pressure on the upper plate 22 acts against the bias of springs 28 to move the plate 22 downwardly, through the filmstrip traversing plane 18, to clamp the filmstrip 14 against the lower, fixed plate 24 so as to lie in and define a filmstrip focusing plane. When the cassette 10 is placed in operative position in the microfilm viewer 50 and the filmstrip 14 is clamped between upper plate 22 and lower plate 24, the filmstrip 14 thereby lies in the proper focal plane for illumination, enlargement and display on a viewing screen.

In the preferred embodiment, the cassette 10 is generally U-shaped and includes a pair of leg enclosure means 30 connected by an intermediate bight portion 32. The bight 32 is defined as that portion of the cassette between the leg means 30 in which the filmstrip 14 is trained over idler rollers 17 to locate the filmstrip traversing plane 18. The front and back sides, 34 and 36, of the enclosure means 30 rotatably support the spool means 12 for winding the filmstrip 14 thereon and rotatably support the idler rollers 17 for training the filmstrip 14 thereover. Since the cassette 10 of the present invention does not grip the longitudinal filmstrip edges, the idler rollers 17 must be at least as wide as the filmstrip being used to support the filmstrip 14 in its traversing plane 18.

The Viewer

The microfilm viewer 50 of this invention comprises several major components, each of which is being described in detail below.

The Module

The viewer 50 includes an upper module 52. The module 52 is spaced by vertical support means 54 from a viewer supporting base 56. The module 52 is enclosed by side panels 58 and 60, top panel 62, back panel 64 and a substantially transparent microimage display and viewing screen 66. The precise configuration of the respective panels is not critical, but in the preferred embodiment they form a generally rectangular container. The bottom panel 68 of the module 52 includes a light ray window (not shown) formed by cutting away a portion of the bottom panel 68. The bottom panel 68 also has a pair of spaced, parallel, carriage-mounting tracks (not shown) constructed thereon and extending along at least part of the depth of the module between the viewing screen 66 and the back panel 64.

The bottom panel 68 of the module 52 has an elongated slot 63 extending therethrough. An electrical control panel 65 is housed adjacent the back panel 64. Wires from the control panel 65 are bound together to form an "umbilical cord" 67 passing from the module 52 to a cassette carriage 74 for reasons explained below.

The Enclosure

Centrally located in the space between the module 52 and the base 56 and resting on the base 56 is a filmstrip illuminating enclosure 70 having a light passing opening 71 formed in its upper surface 72, directly below and aligned with the light ray window in the bottom panel 68 of the module 52. The height of the enclosure 70 is less than the height of the space between the base 56 and module 52.

The Carriage

A cassette-driving and translating carriage 74 includes an upper, generally horizontally-disposed frame 76 and filmstrip driving casing 78. The casing 78 is generally rectangular in shape and depends from one side of the horizontal frame 76. A pair of elongated filmstrip-winding spindles 80 extend outwardly from the front side of the casing 78 on opposite sides of the enclosure 70 and are arranged to slidably enter the bores of the annular spools 12 and to effect driving connection therewith through the medium of one-way sprag clutches not shown, but well known in the art, carried by spools 12. Secured to the side of the horizontal frame 76 opposite the casing 78, a pair of elongated runners (not shown) are spaced so as to engage the track on the underside of the bottom panel 68 and support the carriage 74 for translational movement relative to the viewer module 52 and the enclosure 70.

The carriage 74 translates between a first rearward position in which the frame 76 extends only slightly forwardly of the plane of the viewing screen 66 and a second forward portion in which the frame 76 extends substantially forwardly of the plane of the viewing screen 66. The actual length of travel of the carriage 74 on the tracks is not critical, but the travel must be at least as long as the width of the filmstrip wound in the cassette 10 so that the entire width of the filmstrip can pass over the opening 71 in the filmstrip illuminating enclosure 70 for projection onto the viewing screen 66. In this regard, the length of the slot 63 through the bottom module panel 68, must also be of sufficient length to allow the carriage 74 to traverse the length of the tracks.

The motors and gearing housed within the casing 78 are not pictured because the drive system used to longitudinally move the filmstrip 14 of the present invention closely approximates the motors and gearing fully illustrated and explained in U.S. Pat. No. 3,785,728. It should be understood that variations and modifications of the drive mechanism may be made without departing from the spirit and scope of this invention. The drive system is controlled by the umbilical cord 67 extending from the control panel 65 through the slot 63 and attached to the motors housed within carriage 74.

A variable speed control 82 is positioned at the center and front of the horizontal frame 76 and extends forwardly thereof. By displacing the control to the right, the right-hand spindle 80 is rotated to rotate the spool 12 in the filmstrip cassette 10 and thereby move the filmstrip 14 to the right, whereas displacement of the control 82 to the left similarly effects filmstrip displacement in the left-hand direction. The control 82 is connected to a rheostat for varying the speed of spindle rotation. The further to the right or to the left the control 82 is shifted from its normal inoperative, centrally located position, the greater is the speed of spindle rotation in that direction.

A centrally elongated, transversely and longitudinally extending cut-out (not shown) is located on the frame 76 so as to be aligned with the opening 71 in the top surface 72 of the enclosure 70 when the carriage 74 translates along the module tracks. The frame 76 further includes a pair of handles 84 on opposite sides of the speed control 82 for use in manually moving the carriage 74 relative to the module 52 and enclosure 70. A lock 84 may be provided on the frame 76 to fasten the carriage 74 in its rearward position when not being used so as to prevent cassette theft and unauthorized viewer manipulation.

The Optical System

Viewing FIG. 9, the optical system of this invention will now be described. The enclosure 70 includes a source of illumination such as light 86 behind which a curved reflector 88 directs the light rays emanating from the source of light 86 to impinge on a dichroic folding mirror 90 which filters out infrared rays and directs the light rays upwardly through a condensing lens 92 and through the opening 71 in the upper enclosure surface 72. A heat absorbing filter 94 as well as other heat venting means, may be included within the enclosure 70 to relieve the temperature build-up in the confines of the enclosure 70.

Because the height of the enclosure 70 does not extend upwardly far enough to reach the module 52, a filmstrip 14 may be positioned between the opening 71 in the upper surface 72 of the enclosure 70 and the cut-out in the horizontal carriage frame 76. The projected light rays then pass through the selected portion of the filmstrip trained over the enclosure 70 and enter the module 52 via the light ray window formed in the bottom module panel 68.

The image bearing light rays pass through an objective projecting lens 96 and are directed from a first folding mirror 98 to a second folding mirror 100 to the viewing screen 66 for display. It is to be understood that variations in the size and attitude of the viewing screen and the orientation of the folding mirrors can be made without departing from the scope of the invention. It is however, significant that the optical system is fixed within the viewer 50 and that it is the filmstrip that moves relative to the fixed optical system.

The Separation-Clamping Means

Separation-clamping means 102 provided on the bottom panel 68 of the viewer module 52 are operable to move the filmstrip 14 through the filmstrip passageway means 16 for effecting separation of the upper and lower transparent plates 22 and 24. The separation-clamping means 102 are further operable after a selected portion of the filmstrip 14 has been moved into and stopped in the path of the projected light emanating from the enclosure 70, for clamping the selected filmstrip portion between the upper and lower plates, 22 and 24, in the filmstrip focusing plane.

The separation-clamping means 102 comprises lens assembly means 104 and plate separation means 106.

The Lens Assembly

The lens assembly means 104 includes generally rectangular plate means 108 for attaching the lens assembly means 104 to the module 52 so as to be positioned directly above the upper transparent glass plate 22 in the cassette aperture 20 and the light passing opening 71 in the upper surface 72 of the enclosure 70. The attachment plate 108 includes a large centrally positioned aperture 110 and a pair of smaller apertures 112 adjacent opposite side edges thereof. A pair of stop sleeves 114 depend from the underside of the attachment plate 108 with the bore of the stop sleeves 114 aligned beneath the small apertures 112.

An upper generally rectangular lens plate 116 includes a centrally positioned aperture 118, an eccentric receiving notch 120 on the underside thereof and a pair of rods 122 secured at one of their ends to and depending from the opposite side edges of the upper lens plate 116. The diameter and location of the rods 122 are such that they may be slidably received in apertures 112 and the central bore stop sleeves 114.

A lower, generally rectangular lens plate 124 also includes a centrally positioned aperture 126 and secures the other ends of rods 122 at its opposite side edges. When the attachment plate 108 is securely mounted in the bottom of upper module 52 of the viewer 50, the upper and lower lens plates 116 and 124 are movable en masse as the rods 122 reciprocally slide in the apertures 112. When so mounted, the apertures 110, 118 and 126 are positioned in vertical alignment with each other and with the light passing opening 71 in the upper surface 72 of the enclosure 70, the aperture 20 in the cassette 10 and the light ray window in the bottom panel 68 of the viewer module 52. The upward motion of the lens plates 116 and 124 is limited by the bottom surface of the stop sleeves 114.

An elongated lens-sleeve-receiving-casing 128 is secured to the underside of the upper lens plate 116 for movement therewith. The outer diameter of the lens casing 128 is smaller than the diameter of the attachment plate aperture 110 so that the lens casing 128 is free to slide through the aperture 110 as the upper and lower plates 116 and 124 reciprocate. The lens casing 128 includes a centrally threaded bore 130 therethrough and a notch 132 at its upper plate contacting edge. When the lens casing 128 is secured to depend below the upper plate aperture 118, the lens casing notch 132 and the upper plate notch 120 define an eccentric-receiving opening 134.

An elongated lens sleeve 136 has at its lower end an enlarged-knurled flange 138. The lens sleeve 136 is externally threaded at 140 for reception in the internally threaded bore of the lens casing 128. The knurled flange 138 has a diameter greater than the diameter of the attachment plate aperture 110 so that the lens sleeve 136 must be inserted into the lens casing 128 from below the lens attachment plate 108. Even when so inserted, the lens sleeve 136 is reciprocally movable with the lens casing 128. A projection lens 142 is mounted on lens insertion means 144 to be held within the bore 146 of the lens sleeve 136 in any desirable manner.

A polycarbonate ring 148 may be secured on the bottom side of the lower lens plate 124. The ring 148, being fabricated from a soft, resilient material, will not scratch or otherwise injure a surface with which it makes contact.

Although not shown, an oil stone bearing washer may be inserted in the eccentric-receiving notch 120 formed on the underside of upper lens plate 116. The purpose of the oil stone washer is to soften the sound of impact of the eccentric as it contacts the upper plate 116.

The Separation Means

The separation means 106 includes a solenoid 150, an eccentric shaft 152 and an eccentric 154 at the end of the shaft 152. The shaft 152 is rotatably secured at one end to the solenoid 150. The opposite end of the shaft 152 is placed within the eccentric-receiving opening 134 formed by the lens casing 128 and the upper lens plate 116. The solenoid 150 is then fastened to the bottom of the viewer module 52, whereby activation of the solenoid 150 rotates the eccentric 154 within the eccentric opening 134 such that it strikes the upper plate notch 120, causing the upper and lower lens plates 116 and 124 and parts mounted thereon to slide upwardly from their normal downwardly, gravity-biased position.

Operation

The operation of the microfilm viewing system of the present invention will now be described. The cassette 10 is snapped onto the carriage 74, in the space between the upper viewer module 52 and the viewer base 56, such that the carriage drive spindles 80 engage the cassette spools 12 for rotation thereof. In the preferred embodiment, the cassette 10 is generally U-shaped and the spool enclosure leg means 30 are positioned on opposite sides of the enclosure 70. The window 20 in the bight portion 32 which includes upper and lower glass plates 22 and 24 is positioned to be directly aligned with the opening 71 in the top surface 72 of the enclosure 70, the cut-away portion of the carriage frame 76, the slot in the bottom module panel 68 and the apertures 124, 110, 118, in the lens plates 124, 108 and 116. In this manner an optical light path is formed from the enclosure 70, through the opening, the cassette window 20, the carriage frame 74, the bottom module plate 68 and into the objective projection lens 142.

In the normal, unactivated position of the glass plate separation-clamping means 102, the weight of the lens plates 118 and 124, the lens sleeve 136 and the lens casing 128, acting under the influence of gravity, slides the separation-clamping means 102 downwardly. In this downward position, the polycarbonate ring 148 rests on and depresses the upper glass plate 22 against the bias of the springs 28 to move the filmstrip 14 from the filmstrip traversing plane 18 to the filmstrip focusing plane in which the filmstrip 14 is clamped between the upper and lower glass plates 22 and 24 at the focal point of the projection lens 142. In this position the carriage 74 may be translated along the tracks to select a microimage frame from a column of frames printed on the filmstrip width.

When it is desired to move the filmstrip 14 longitudinally the control 82 is pushed in the right or left-hand direction to correspondingly move the filmstrip 14. The further to the right or left the control 82 is shifted, the greater is the speed of spindle rotation. The solenoid 150 is energized simultaneously with activation of the control 82. Energization of the solenoid 150 rotates the eccentric 154 at the end of eccentric shaft 152 within eccentric opening 134 to contact the bottom of the upper lens plate 116 and thereby lift the glass plate separation-clamping means 102 upwardly. As the separation-clamping means 102 moves upward, the upper glass plate 22 is also allowed to move upwardly under the bias of the springs 28. This serves to release the filmstrip 14 for longitudinal movement through the transverse passageway aperture 20 in the filmstrip traversing plane 18 to present a selected row of microimage frames in the aperture 20.

It is thus seen that the use of the control 82 and the traversing carriage 74, presents a selected microimage frame from any filmstrip row or column into the path of projected light for illumination, enlargement and display on the viewing screen 66.

While one form of the invention has been described, it will be understood that the invention may be utilized in other forms and environments, so that the purpose of the appended claims is to cover all such forms of devices not disclosed but which embody the invention disclosed herein.

What is claimed is:

1. In a viewer of microimages arranged upon an elongated filmstrip in columns along the length of the filmstrip and in rows transverse to said columns, wherein the viewer includes a source of illumination, means for projecting the illumination along an optical axis that intersects the filmstrip, and then projects an illuminated image from the filmstrip, enlarges same, and displays the enlarged image upon a viewing screen; the improvement comprising, in combination:

a support base; a viewing module that includes said viewing screen, means mounting said module in spaced relation from said support base to define a recess between said module and base; an enclosure on said base spaced from and below said viewing module to define an elongated passageway between said enclosure and the viewing module; track means on the module; a carriage suspended and supported from and movable manually along said track means, within said elongated passageway; a filmstrip-carrying, U-shaped cassette with a light transmitting bight portion supported from the carriage with said bight portion of the cassette movable in said elongated passageway; illuminating means in said enclosure projecting light along an optical axis that projects through the bight portion of the cassette and to enter the viewing module; motor means on the carriage for selectively moving the film within the cassette in directions transverse to said optical axis and parallel to the columns of microimages on the filmstrip; and the cassette and carriage being constructed to be selectively manually movable along said track means, even simultaneously with motorized movement of film within said cassette in directions parallel to columns of microimages, for moving the cassette with film therein transverse to the optical axis and parallel to the rows of microimages on the filmstrip.

2. The viewer of claim 1 wherein the means on the carriage for selectively moving the film within the cassette includes electrical controls that are housed within the module, the motor means for driving the filmstrip being carried by the carriage, and wire means extending between said electrical controls and the motor means on the carriage, the module defining slot means therein through which the wire means extends and moves to provide control for the motor means on the carriage as the carriage moves along the track means.

3. The viewer of claim 2 wherein the carriage is movable along the track means at least a distance sufficient to traverse the width of the filmstrip in the cassette.

4. The viewer of claim 1 wherein the means for driving the cassetted filmstrip includes a pair of drive spindles mounted on the carriage and adapted for driving engagement with film carrying spools in a microfilm cassette.

* * * * *